July 31, 1934.     J. WALKER     1,968,109
SPRING MOUNTING
Filed Jan. 6, 1933
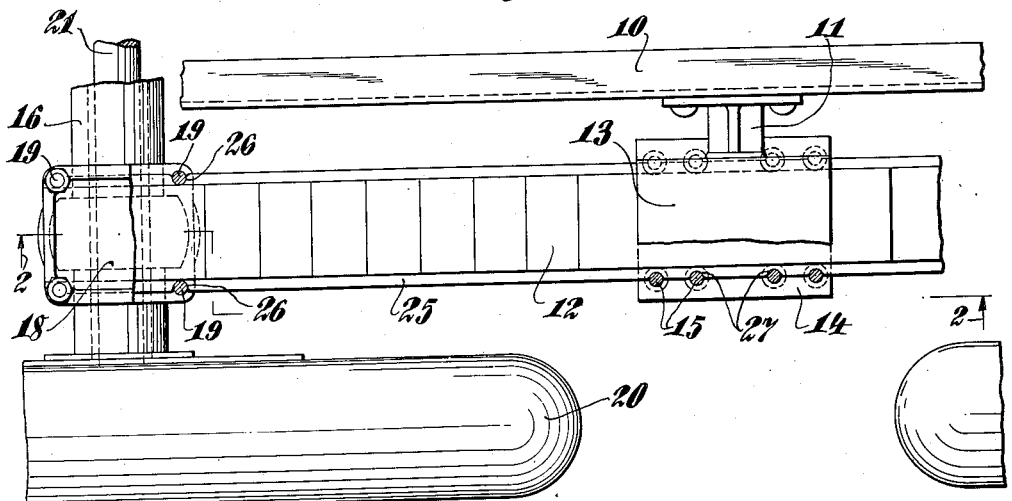
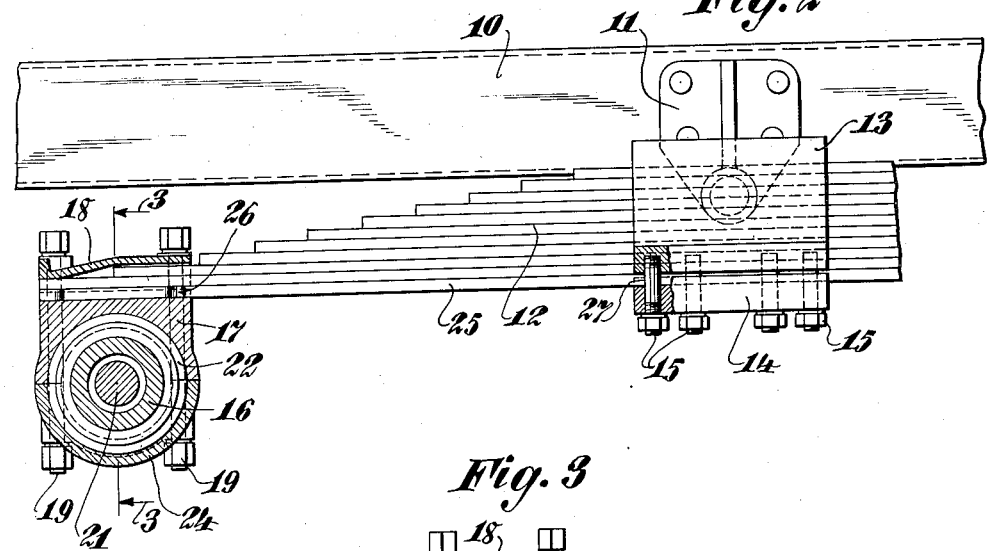
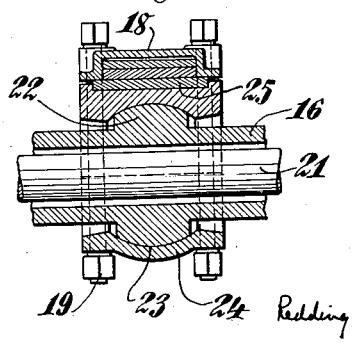
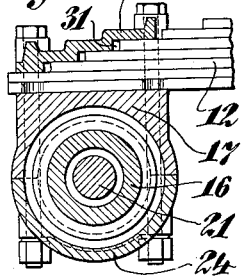
INVENTOR
John Walker,
BY Redding, Greeley, O'Shea & Campbell
HIS ATTORNEYS Patented July 31, 1934

1,968,109

UNITED STATES PATENT OFFICE 1,968,109

SPRING MOUNTING

John Walker, Westfield, N. J., assignor to International Motor Company, New York, N. Y., a corporation of Delaware Application January 6, 1933, Serial No. 650,430

2 Claims. (Cl. 267—41)

The present invention relates to spring suspensions for motor vehicles and embodies, more specifically, an improved form of spring suspension wherein a vehicle is more effectively secured to the frame and axle of a vehicle than in constructions heretofore available.

More particularly, the invention embodies an improved spring suspension for motor vehicles wherein an improved means is provided for securing the spring to the frame and axle of the vehicle, the construction being such as to effectively prevent the displacement of the spring with respect to the saddle secured thereto.

An object of the invention, accordingly, is to provide an improved spring mounting for motor vehicles wherein a spring may be secured effectively to a motor vehicle frame and directly to an axle in such fashion that the spring does not slip with respect to the frame or axle.

A further object of the invention is to provide a spring mounting wherein a spring may be secured effectively to an axle or frame in such fashion that slippage with respect thereto is effectively eliminated and a desired spring strength and rigidity preserved.

A further object of the invention is to provide a spring construction by means of which the mounting of the spring upon an axle and vehicle frame is facilitated by means of the provision of a widened leaf, in the widened portions of which notches are formed to receive the securing members.

Further objects, not specifically enumerated above, will be apparent as the invention is described in greater detail in connection with the accompanying drawing, wherein:

Figure 1 is a segmental plan view with the elements partly broken away and in section, showing a semi-elliptic spring suspension constructed in accordance with the present invention.

Figure 2 is a view in section, taken on line 2—2 of Figure 1, and looking in the direction of the arrows, a portion of the spring anchorage being broken away and shown in section.

Figure 3 is a view in section, taken on line 3—3 of Figure 2, and looking in the direction of the arrows.

Figure 4 is a view in section similar to Figure 2, showing a modified form of connection between a spring and axle.

With reference to the above drawing, a portion of a vehicle side frame member is shown at 10 to which an anchor tube or other supporting member 11 is secured. A spring 12 is secured to the anchor tube 11 by means of a saddle 13 which fits over the spring and is provided with a bottom plate 14 secured to the saddle by means of bolts and nuts 15. The ends of spring 12 are secured to axles 16 by means of brackets 17 having cover plates 18 secured thereto by means of bolts 19. The cover plate 18 and bracket 17 are so constructed that the bolts 19 are spaced adjacent the sides of spring 12, the ends of spring 12 being received within the cover plate 18 and secured therein as shown in Figure 2.

Wheels 20 are mounted upon the axles 16 and are adapted to be driven in any suitable fashion as by means of jack shafts 21. In order that deleterious twisting stresses may not be transmitted to the spring 12, brackets 17 are mounted upon axles 16 by means of a universal connection afforded by spherical ball member 22 which is mounted within a cooperating spherical bearing surface 23 formed within brackets 17. A bottom plate 24 is provided for bracket 17, this plate cooperating with the spherical ball member 22 to complete the connection shown in Figures 2 and 3. One ball connection on each axle 16 is preferably mounted slidably with respect to the axle in order that the effective distance between the ends of the springs 12 may vary with tilting of the axle.

An effective spring mounting is afforded by the provision of a lower leaf 25 upon spring 12, this lower leaf being wider than the remaining leaves of the spring as shown in Figure 1 and being notched at a plurality of points at the ends thereof, as shown at 26, to receive the bolts 19, and at a plurality of points 27, adjacent the median section thereof to receive the bolts 15. By providing the saddles which surround the axles and ends of springs 12, the axles may be clamped securely to the lower or main leaf of the spring, this leaf being wider than the remaining leaves of the spring and notch as described above. In as much as the saddles are clamped securely to the lower leaf only of the spring, the remaining leaves are free to function effectively to support the gravitational stresses impressed thereon and are isolated from the deleterious stresses which these leaves ordinarily have impressed thereon during operation. The foregoing construction effectively prevents the saddles from slipping off of the ends of the springs and the center trunnion brackets are also prevented from slipping upon the spring by means of the notch construction outlined above.

Figure 4 shows a modified form of connection between the axle housing and adjacent spring end. In this construction the housing cover designated by the reference character 18 in the construction shown in Figure 2 has been replaced by a housing cover 30 having a plurality of recesses 31 within which the ends of the leaves of spring 12 are received. The recesses 31 are so formed as to afford bearing surfaces for the respective leaves which are received therein at the same time permitting free endwise movement of such leaves to accommodate closing of the spring. This construction affords a firmer fastening of the axle to the spring and reduces the tendency to break the end of the spring under forces occasioned by the brake and torque reactions imparted thereto through the lever arm of the wheel on the end of the spring.

The foregoing construction enables the change in center distance due to spring deflection to be practically eliminated, the resulting spring construction being such as to afford a very stiff connection with very little deflection between no load and full load.

While the invention has been described with specific reference to the accompanying drawing, it is not to be limited, save as defined in the appended claims.

I claim as my invention:

1. A leaf spring having a plurality of leaves in superposed position and having the lowest leaf thereof wider than the others, the lowest leaf being formed with recesses in the portion thereof wider than the other leaves, a first member engaging the lower side of the lowest leaf, a second member lying over other of the leaves above the lowest leaf and extending downwardly at the sides of the said leaves toward the first member but terminating in spaced relation thereto, and means lying in the recesses to secure the first member to the downwardly extending portions of the second member.

2. A leaf spring having a plurality of leaves in superposed position and having the lowest leaf thereof wider than the others, the lowest leaf being formed with recesses in the portion thereof wider than the other leaves, a first member engaging the lower side of the lowest leaf, a second member lying over other of the leaves above the lowest leaf and extending downwardly at the sides of the said leaves toward the first member but terminating in spaced relation thereto, the second member forming a cover for an end of the spring and having recesses to receive the ends of all of the leaves extending therein, and means lying in the first mentioned recesses to secure the first member to the downwardly extending portions of the second member.

JOHN WALKER.